UNITED STATES PATENT OFFICE.

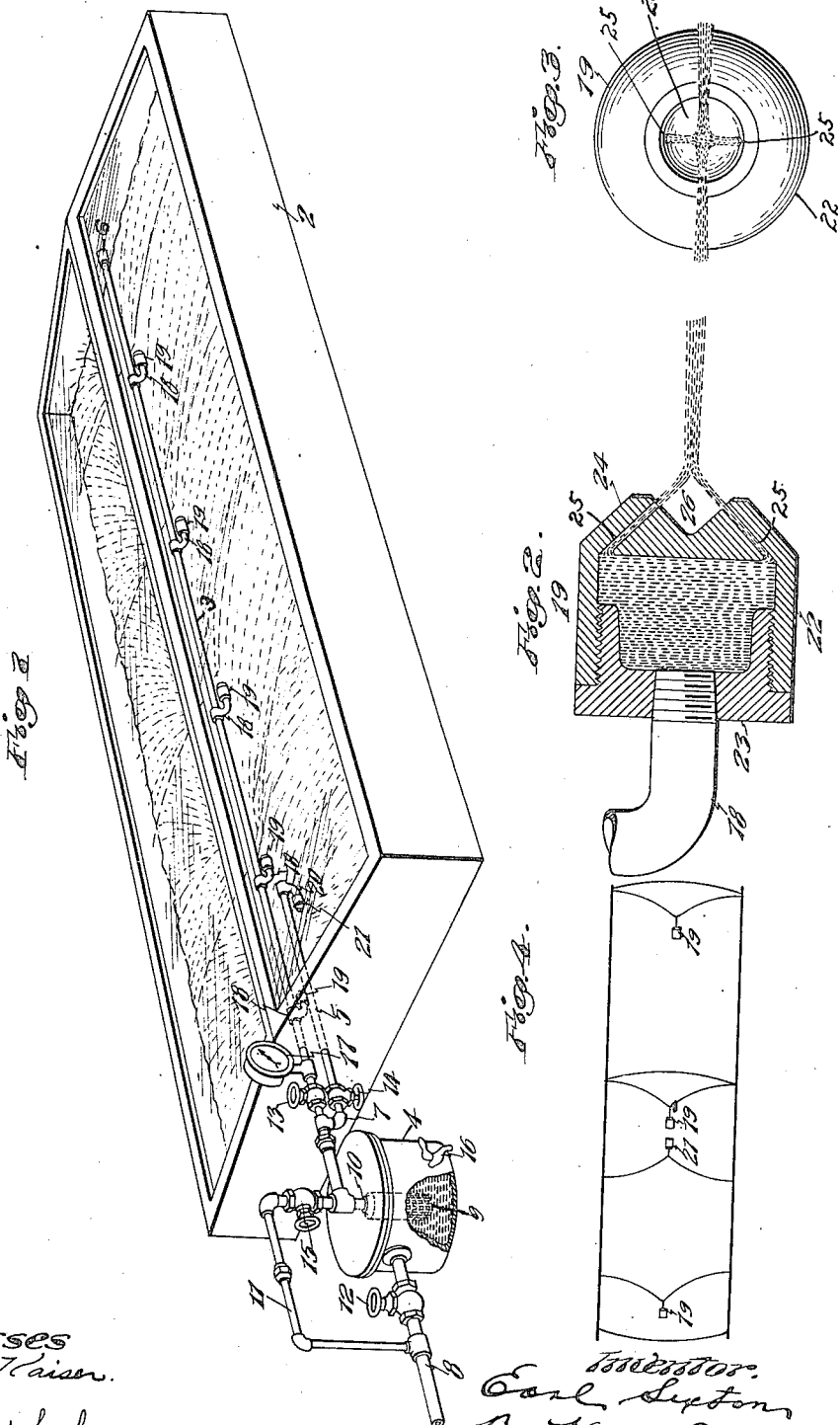

EARL SEXTON, OF HARTFORD, CONNECTICUT.

HOTBED-SPRINKLER SYSTEM.

1,164,128.  Specification of Letters Patent.  Patented Dec. 14, 1915.

Application filed March 2, 1915. Serial No. 11,534.

*To all whom it may concern:*

Be it known that I, EARL SEXTON, a citizen of the United States, residing at Hartford, in the county of Hartford and State of Connecticut, have invented certain new and useful Improvements in Hotbed-Sprinkler Systems, of which the following is a specification.

This invention relates to hot bed sprinkler-systems.

One of the objects of the invention is the provision of means by which a predetermined area can be uniformly, evenly and thoroughly sprinkled.

Another object is in so associating the system with a hot bed that the plants in the latter can be properly sprinkled without removing the sash or sashes constituting the top of the hot bed.

The apparatus possesses other features of novelty and advantage, which with the foregoing will be stated at length in the following description wherein I will set forth in detail that one of the several convenient forms of embodiment of the invention which I have selected for illustration in the drawings accompanying and forming part of the present specification. I do not restrict myself to this disclosure; I may depart therefrom in several respects within the scope of the invention defined by the claims following said description.

Referring to said drawings: Figure 1 is a perspective view of a hot-bed sprinkling system involving my invention, a part of the filter device being removed. Fig. 2 is a vertical sectional view of a sprinkler-head showing also in elevation portion of an elbow. Fig. 3 is a face view of said sprinkler, and, Fig. 4 is a diagrammatic view hereinafter more fully described.

Like characters refer to like parts throughout the several figures of the drawings.

In Fig. 1 I have represented a hot-bed such as that denoted in a general way by 2, which is adapted to receive within it plants and having the usual top consisting of one or more glazed sashes which can be lifted when required to obtain access to the plants or for any other desired purpose. The invention is of such character, however, that the plants can be adequately sprinkled without lifting these sashes or equivalent top of the hot bed 2 which is a feature of considerable importance. When the system is used in conjunction with plants the substance sprinkled may be of any desirable nature, for instance water. Any other liquid might be employed as will be inferred.

There is a main supply pipe as 3 which extends through one end of the hot bed 2 to almost the other end thereof, the said supply pipe receiving the liquid in any desirable manner. When water is the liquid it may if desired be passed through a filter-device as 4. That end of the supply-pipe 3 which is connected practically directly with the filter device 4 has united with it an auxiliary supply-pipe as 5, the other end of the main pipe being furnished with a plug as 6. The auxiliary pipe 5 is shorter than the main pipe 3, the two however, being vertically alined, and in parallelism, the auxiliary supply pipe as shown being connected with the main pipe in some suitable way as by the elbow 7. The main 8 opens into the filter-device 4, the tank of the latter having within it a filter 9 to which the off take 10 is connected, the main supply pipe 3 being connected with the off-take 10 above the tank of the filter device 4. The off-take 10 above its point of connection with the main supply pipe 3 is connected by a by-pass as 11 with the main 8 just back of the valve 12. The main supply-pipe 3 forward of its point of connection with the auxiliary supply pipe 5 is provided with a valve 13, the auxiliary supply pipe 5 having a valve 14. By the manipulation of these valves 13 and 14 the flow of the liquid into the main and auxiliary supply pipes 3 and 5 respectively can be controlled. I might note that it is my practice to utilize these pipes 3 and 5 in alternation and by the use of the valves 13 and 14 I can attain this function. The by-pass connection 11 is furnished with a valve 15.

By opening the valve 12 and closing the valve 15, the liquid can be caused to enter the receiving end of the main pipe 3 and if the valve 13 be opened, said liquid will traverse said pipe 3. By opening the valve 15 and closing the valve 12 and at the same time opening the draw-off cock 16, the filter device 4 can be flushed.

While I have briefly described a filter-device and certain of its adjuncts the same may be wholly omitted. I have described this construction merely because it is one of several convenient ways of delivering the necessary liquid to the main and auxiliary supply pipes 3 and 5 respectively. If desired and as illustrated the main supply pipe 3 may be furnished with a pressure gage 17 to regulate the pressure of the water in said pipe 3 by means of the valve 13. As shown the main and auxiliary supply pipes 3 and 5 are disposed approximately centrally of the width of the hot bed 2.

As one of the more important features of the invention, I provide means for producing several sprinkler bodies which overlap so that I can cover a wide area, and as a matter of preference I prefer that these sprinkler bodies be joined, suitable sprinkler heads as will hereinafter appear being so arranged that the sprinkler body created by one head will merge into the butt or inner portion of the sprinkle body or stream in advance of it, the sprinkle bodies as I have considered them, being practically of segmental form, a sprinkle head or equivalent being furnished to obtain a properly formed, sprinkle-body. There is provided preferably a series of main sprinkler heads which direct their sprinkle streams or bodies all in the same direction, and in addition another head which directs a practically similar stream in the opposite direction so that when the system has performed its function the entire area which it is intended to cover will be properly sprayed. The streams as they initially emerge or issue from the sprinkler heads are in parallelism with the soil in the hot bed.

The pipe 3 has connected with it for instance by means of suitable elbows as 18 the sprinkler heads 19 which are horizontally alined and the sprinkle streams from which are horizontally disposed. The inner end of the pipe 5 is provided with an elbow 20 and a sprinkler head 21 exact counterparts of the elbows 18 and heads 19 respectively. It will be understood that the sprinkle streams from the heads 19 are all projected in the same direction, while the spray from the head 21 is delivered in the opposite direction. The head 21 is located between the first and second of the main heads 19 so that that part of the area inclosed by the hot bed 2 which is not sprinkled by the first head will be sprinkled by the auxiliary head 21.

As all of the sprinkling heads are the same in construction a detailed description of one will apply to the others and for this purpose reference may be had to Figs. 2 and 3. The head 19 shown in these views comprises a shell-like body 22 in which is tapped the plug member 23. This produces an internal chamber. The elbow 18 is threaded into the outer diaphragm or wall portion of the plug 23. The forward portion 24 of the shell 22 is of frusto-conical form and it has bored through or otherwise formed in it the two ports or passages 25 located approximately at right angles to each other. The inner ends of these ports are located practically at the inner surface of the shell 22 opening in the rear surface of the frusto-conical portion 24. The axes of the two ports converge at a point forward of the flat front of the portion 24 and which point is virtually intersected by the longitudinal axis of the head 19, the streams issuing from the two ports or passages therefore, merging practically at such point. To insure the free mergence of the two jets or streams at the point indicated I prefer to form in the portion 24 a concavity 26, the best effects being secured by making said concavity or chamber 26 of conical shape. In view of this condition the two streams or jets can join without obstruction or interference and owing to their mergence they create a stream which is practically of segmental form and which is horizontally disposed. The sprinkler bodies when the main heads 19 are in action comingle; that is to say the sprinkle body issuing from the first head joins the sprinkle body of the second head at a point forward of the juncture of the two streams which issue from said second head and so on throughout the series, the lateral portions of the sprinkle streams or bodies striking against the sides of the hot bed 2.

In using the system I first open the valve 13 and close the valve 14, it being understood that the valve 15 is closed and the valve 12 opened. The consequence is that the liquid will pass into the main pipe 3 and will issue from the sprinkler heads 19 so as to sprinkle almost the entire area of the bottom of the hot bed 2. After the plants have been wet down to the requisite extent the valve 13 is closed and the valve 14 opened, thus cutting off the supply of liquid to the pipe 3 and permitting the liquid to flow into the pipe 5, by reason of which the sprinkler head 21 can spray the area that has not been sprayed by the heads 19.

In view of the construction of the sprinkler heads I find that it is not necessary that the liquid in the pipes 3 and 5 be under high pressure; as a matter of fact, I secure excellent results where the pressure is quite low, for example approximately six pounds. Owing to the somewhat attenuated ports 25 there issue from the latter two small streams of considerable force, which merge into each other and form a thin segmental stream which extends over a large lateral area. The fact that the two streams are of small size increases their pressure and owing to their juncture the segmental sprinkle stream which they make covers a large area.

What I claim is:

1. The combination of a hot bed, a series of stationary nozzles extending longitudinally of the hot bed between the sides thereof, and means for supplying the nozzles with liquid, the nozzles being shaped to project approximately segmental streams, spaced apart to effect overlapping of the streams and being also adapted to initially direct the streams in approximate parallelism with the soil of the hot bed.

2. The combination of a hot bed, a fixed supply pipe extending longitudinally of the hot bed between the sides thereof, said pipe being provided with stationary nozzles shaped to project approximately segmental streams all in the same direction, spaced apart and in overlapping relation, the nozzles being adapted to initially direct the streams in approximate parallelism with the soil of the hot bed and said supply pipe having a nozzle between the first and second nozzles to direct a similar stream but in a direction opposite to that of the other streams.

3. The combination of a hot bed, and a fixed supply pipe extending longitudinally of the hot bed between the sides thereof, said pipe being provided with stationary nozzles shaped to project approximately segmental streams all in the same direction, spaced apart and in overlapping relation, the nozzles being adapted to initially direct the streams in approximate parallelism with the soil of the hot bed and said supply pipe being situated between the top of the hot bed and the soil of the hot bed.

In testimony whereof I affix my signature in presence of two witnesses.

EARL SEXTON.

Witnesses:
L. L. MARKEL,
HEATH SUTHERLAND.